Sept. 4, 1923.　　　　　　　　　　　　　　　　1,467,049
H. J. LONG
EMERGENCY FUEL VALVE CONTROL APPLIANCE
Filed Nov. 4, 1919　　　　4 Sheets-Sheet 1
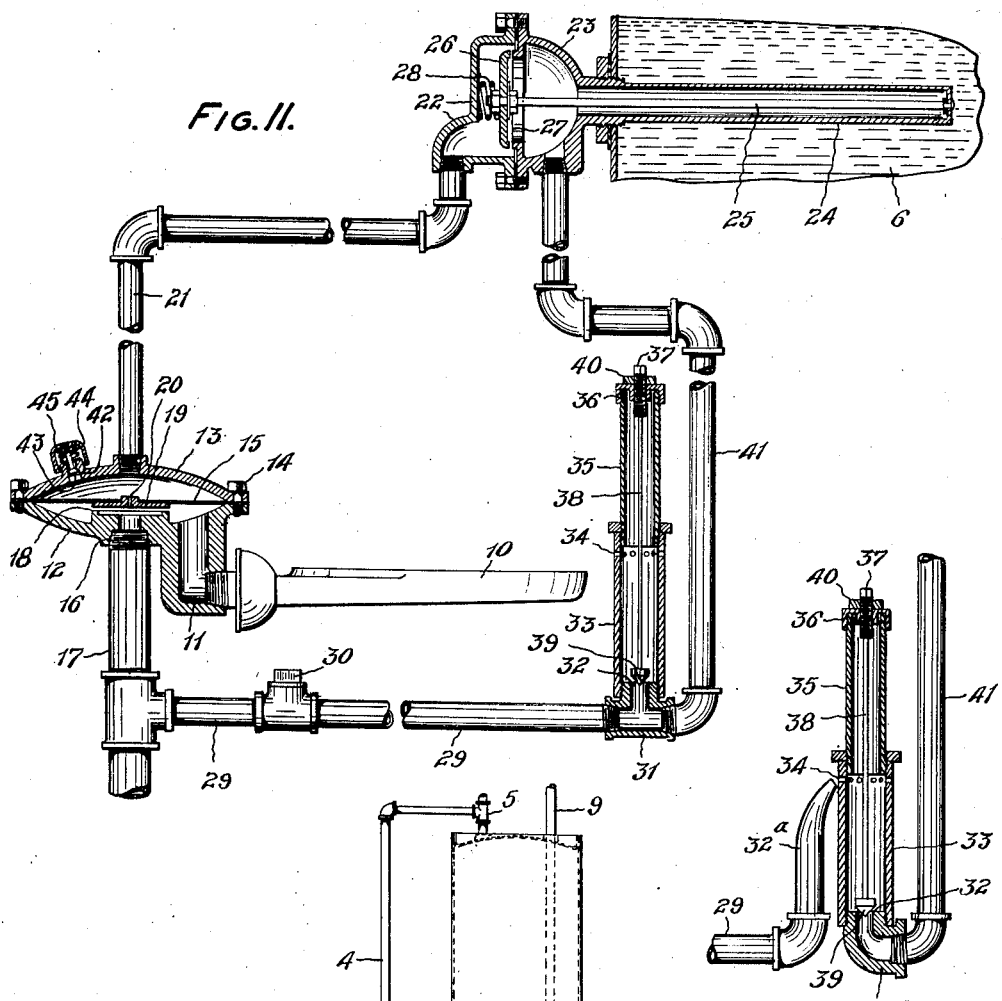
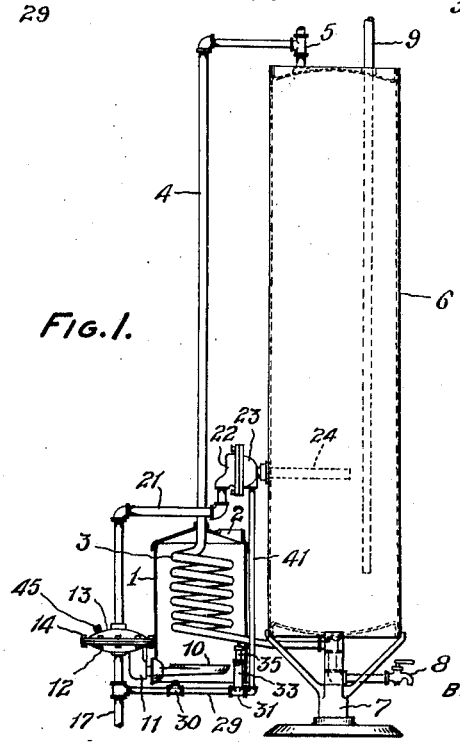
INVENTOR:
HERBERT J. LONG
BY HIS ATT'Y Sept. 4, 1923.
H. J. LONG
1,467,049
EMERGENCY FUEL VALVE CONTROL APPLIANCE
Filed Nov. 4, 1919  4 Sheets-Sheet 2
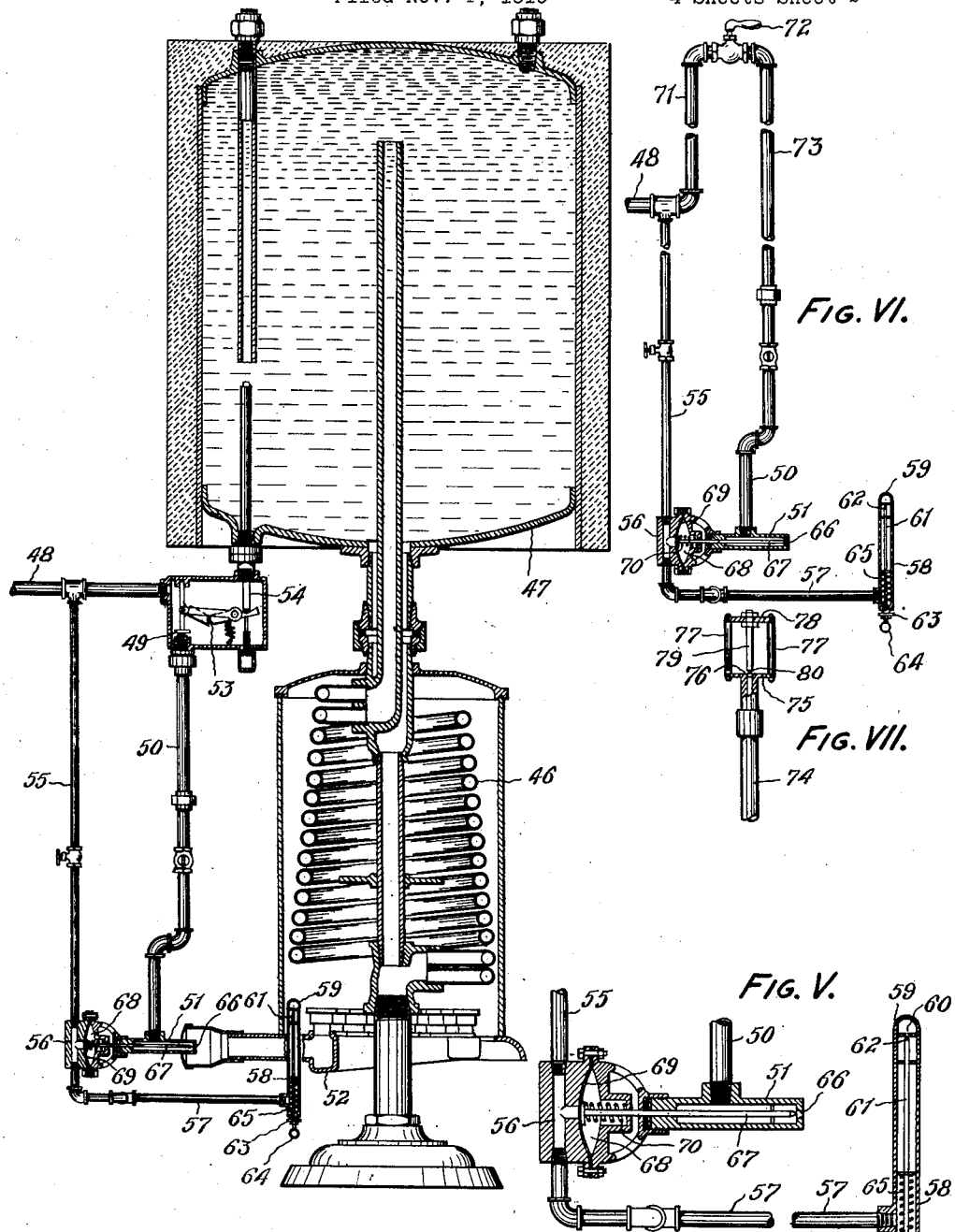
FIG. IV.  FIG. V.  FIG. VI.  FIG. VII.
INVENTOR:
HERBERT J. LONG
BY HIS ATTY

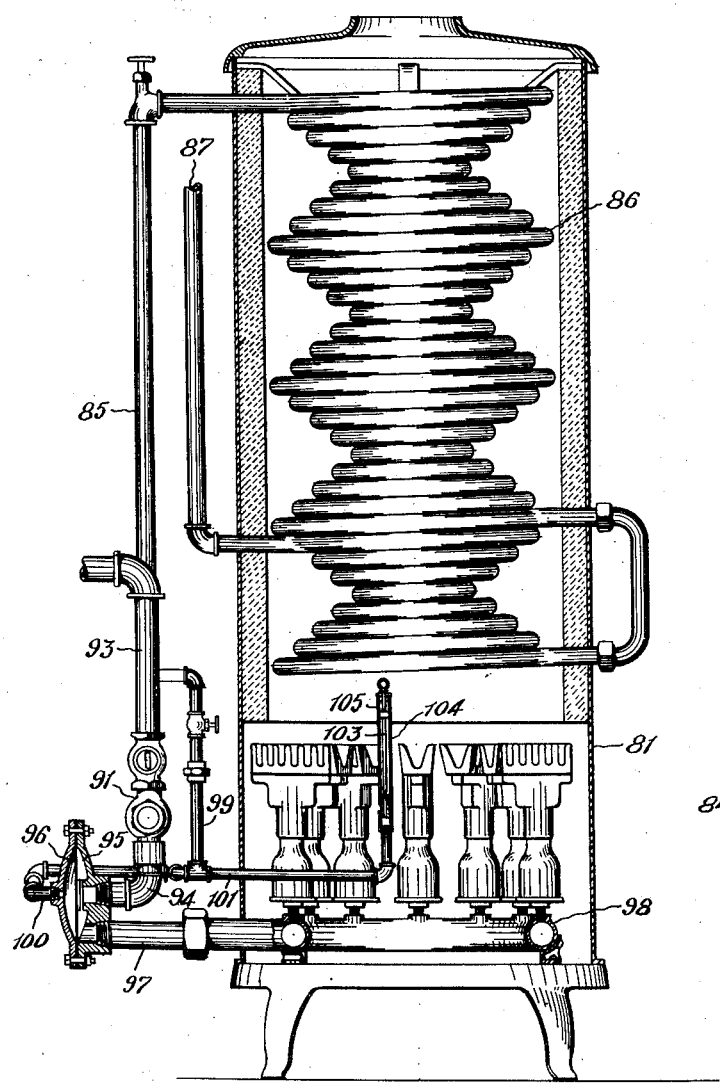

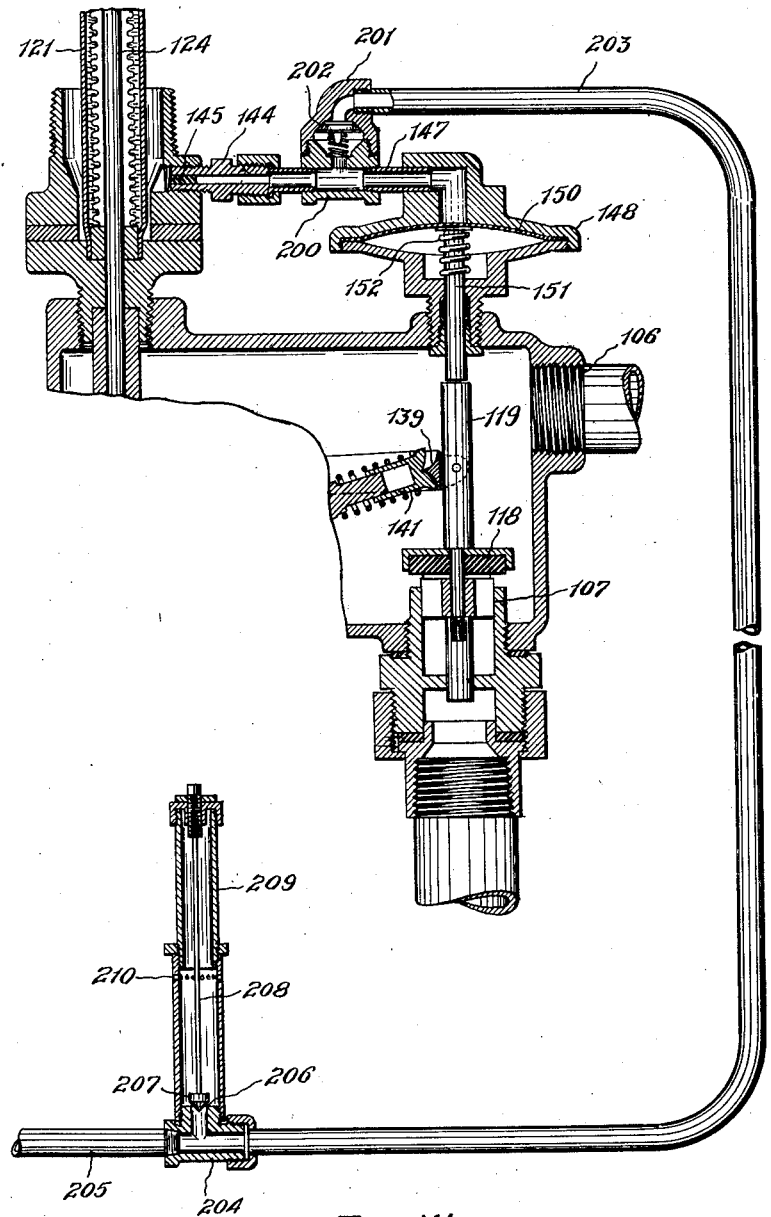

Patented Sept. 4, 1923.

1,467,049

UNITED STATES PATENT OFFICE.

HERBERT J. LONG, OF NEW BRUNSWICK, NEW JERSEY, ASSIGNOR TO THE KOMPAK COMPANY, OF NEW BRUNSWICK, NEW JERSEY.

EMERGENCY FUEL-VALVE-CONTROL APPLIANCE.

Application filed November 4, 1919. Serial No. 335,651.

*To all whom it may concern:*

Be it known that I, HERBERT J. LONG, a citizen of the United States, residing at 239 Harrison Ave., in the city of New Brunswick, county of Middlesex and State of New Jersey, have invented a new and useful Improvement in Emergency Fuel-Valve-Control Appliances, of which the following is a specification, the principle of the invention being herein explained and the best mode in which I have contemplated applying that principle, so as to distinguish it from other inventions.

My invention relates to an improved thermostatic control and more particularly to what may be termed an emergency fuel valve control appliance. Inasmuch as the principle of my present invention may be applied in many branches of the heating industry, I have illustrated in the drawings a series of modifications including several pertaining to water heating apparatus.

I am well aware that the development of thermostatically controlled devices has extended over a period of several decades and that the prior art, practiced and patented, discloses many adaptations of the underlying principle. There has been a main gas valve control comprising a thermostat together with an intermediation of fluid pressure to be alternatively exerted and released (Johnson No. 542733). There have been purely mechanical connections of both the gradually actuated (Gordon No. 545199) and the snap actuated type (Ruud No. 853,738) between a thermostat and a main gas valve. At the begining of the present century a domestic patent (Ruud No. 682345) was issued for an auxiliary thermostat control operative upon extinguishment of a pilot burner to close a main gas valve. More recently, a thermostat has been employed to operate in conjunction with a diaphragm valve and a bleed pipe, the former adapted to be reverse actuated according as a pressure is released or built up by opening or closing the latter respectively (Robertshaw No. 1097265.)

In any apparatus including a heater using a fuel gas it is a great convenience to have an automatic control of the ignition of the main burner by means of a pilot burner. Two types including automatic control have been developed in the water heating art, namely, the thermostatic control and the pressure control. In the case of the latter the pressure might be either that of the water main or that of the gas main. In form thermostatic movement is communicated either directly (mechanically) or indirectly (by the intermediation of fluid pressure) to the gas valve. Otherwise, water pressure was caused to move a piston connection with the gas valve so as to open the latter whenever water is drawn at a faucet and the equilibrium of pressure on opposite sides of such piston was thereby disturbed. An ever present danger has been associated with all of these forms of automatic control because the pilot light occasionally becomes extinguished, due either to down draft in the chimney, to hindering of the meter action, to inadvertent presence of grease in the pilot, to a carbonization of its outlet orifice or to temporary cessation of supply of gas thereto. Accompanying such occurrence was the hazard of asphyxiation or an explosive mixture accumulating in the heater with the inevitable danger in consequence of any attempt to re-light the burner.

My invention carries forward previous attempts to insure safety by combining thermostatic control right at the pilot, so as to be subject to the existence or non-existence of its flame, with power translating agencies including gas pressure exerted against a diaphragm valve. The preferred structural embodiment of my idea comprehends the use of an auxiliary valve at the pilot burner together with a thermostat affected by the heat from the pilot flame, so that the thermostatically initiated movement either opens or closes such auxiliary valve and in doing so either builds up or releases a gas pressure against a diaphragm valve which controls the gas supply to the main burner. Various detailed features are embraced by my complete apparatus which are also likely to be novel, but to which reference is less appropriate in this foregoing part of my specification.

Adverting to the drawings:—

Figure I is an elevation of a storage water heating apparatus embodying my invention.

Figure II is an enlarged view, largely in section, of certain parts as appearing in Figure I.

Figure III is a correspondingly enlarged detail view showing a modified pilot burner and thermostat in operative proximity thereto.

Figure IV is mainly a vertical section through a unitary storage heater together with a somewhat altered adaptation of my invention.

Figure V is an enlarged partly sectional view of modified details operating according to the principle of my invention.

Figure VI is a diagrammatic view of a modified form of valve operating mechanism subject to manual control.

Figure VII is an enlarged detail of a modified form of pilot thermostat.

Figure VIII illustrates the application of my invention to a type of instantaneous water heater having its main gas burners ordinarily controlled automatically by water pressure.

Figure IX is a section through the water control gas valve.

Figure X is an enlarged sectional view of the modified pilot thermostat construction shown in Figure VIII.

Figure XI is a further modification of my invention adapted to one of my earlier inventions and consists of a broken sectional view corresponding to one of the views of the drawing of an earlier patent application.

Figure I shows a heater casing 1 provided above with a stack opening 2 and containing a water heating coil 3 having outlet through the pipe 4 with a T 5 suitably connected below with a storage tank 6 and above with a service faucet, not shown. The tank 6 is supported on a standard 7 and has in connection with its bottom a drain cock 8. A pipe 9 connects the storage tank with a source of water supply.

Supported in any suitable manner in the casing 1 and below the coil 3 is a main gas burner 10 having connection with a duct 11 which leads through one side of one wall 12 of a diaphragm valve chamber. Mounted between annular flanges of the wall 12 and another wall 13 by means of circumferentially arranged cap screws 14 is a flexible diaphragm 15. Entering the center of the wall 12 through an opening 16 is a main gas supply pipe 17. Interiorly the wall 12 is fashioned about the opening 16 as a valve seat which is of smaller circumference than the circumference of the diaphragm 15. The center of the diaphragm 15 carries a weighting valve member 19 provided with a small centrally located leakage port 20.

In Figure II the arrangement of the parts should be understood to be such that the valve member 19 may be brought into engagement with the seat 18 so as to shut off the supply of gas to the main burner when the diaphragm 15 is flexed downwardly. Leading out of the wall 13 is a pipe 21 having its other end connected with a composite valve chamber including walls 22 and 23. The latter carries a thermostatic tubular element 24 which projects into the storage tank 6 and has a relatively higher coefficient of expansion than a rod 25 which is disposed interiorly and connected to the inner end thereof, in a manner common to the art. The other end of the rod 25 is connected with a valve member 26 adapted to cooperate with a valve seat 27 carried by the wall 23. The auxiliary valve member 26 is normally held against the seat 27 by means of a spring 28, the action of which may be overcome so as to allow a flow of gas whenever the temperature of the water in the tank 6 falls below a predetermined degree, whereupon contraction of the element 24 actuates the rod 25 so as to move the valve member 26 away from its seat 27.

Connected with the main gas pipe 17 ahead of the diaphragm chamber is a pipe 29 provided with a shut-off cock 30 enabling regulation of the pressure and leading to a thermostatic pilot burner embodying some of the principles of my invention which are believed to be novel. The further end of the pipe 29 connects with a T 31 having an upwardly disposed outlet opening 32. In screw threaded connection around the opening 32 is a brass tube 33 provided just above the main burner 10 with orifices 34 for the pilot flame. Screwed in turn into the upper end of the tube 33 is a copper tube 35 constituting the initiating element of my pilot thermostat when subjected to the heat of any flame issuing from the orifices 34 and caused to expand when so heated as well as when heated by the flame from the main burner 10. The upper end of the copper tube 35 carries a perforated cap 36 in which an adjusting screw 37 is fitted. This screw carries interiorly of the tubes 33 and 35 a small rod 38 having its other end formed as a conical point 39 adapted to snugly fit the inlet opening 32. A lock nut 40 serves to hold the screw 37 in any of its adjustable positions. The adjustment of the end 39 with reference to the opening 32 is made such that the maximum contraction of the tube 35 likely to occur under ordinary conditions which will just firmly effect what is the equivalent of a needle valve closure between the end 39 and opening 32. The diameter of the rod 38 is however made small enough so that in the event of an inordinate contraction of the tube 35 and an undue pressure in consequence of the end 39 against the rim of the opening 32, the rod 38 will yield with a bending action. As will be readily understood by those who are skilled in the art the expansion and contraction of the tube 35, depending upon whether there is or is not a flame in proximity thereto, serves to either open or close the valve connection between the opening 32 and end 39 and thereby to either permit or preclude the flow of gas to the orifices 34. What may be termed a bleed pipe 41 affords connection between the wall 23 and T 31 for a purpose to be hereinafter explained.

Another feature of my invention is a push button control or auxiliary manual regulation of gas flow to the main burner. The upper wall 13 of the diaphragm valve chamber is provided with an opening 42 fashioned as a valve seat and cooperating therewith is a valve 43 normally held against its seat by a spring 44 which forces a hollow push button 45 attached to the valve stem in an upward or closing direction. As will be apparent upon inspection of Figure II a finger depression of the button 45 will act to move the valve member 43 from its seat and thus afford open communication between the upper side of the diaphragm 15 and the atmosphere, so as to relieve any pressure there existent.

As will now have been observed, my invention broadly comprehends an emergency fuel valve control appliance and specifically a thermostatic pilot control of a diaphragm gas valve as an auxilary or safety provision in addition to a thermostatically actuated pressure control valve. More particularly, I employ a pilot thermostat for controlling not only the flow of gas to a main burner, which is old, but for also controlling the flow of gas to the pilot burner itself and for controlling as well the flow of gas and therefore the pressure of gas in a bleed pipe. Notwithstanding the crowded state of the patented art, I have reason to believe that my double control by means of a pilot thermostat is novel.

Pilot thermostats have been used to mechanically close a main gas valve as in the Ruud patent earlier identified. The Robertshaw and Brown patents herein identified typify earlier diaphragm valve controls. The Mustee patent shows a thermostatically controlled valve for in turn controlling a diaphragm gas valve which latter is likewise alternatively subject to the pressure of gas in the main line. The Mauck patent adds still further to the prior art combinations by actually disclosing a pilot burner with an arrangement familiar in principle to Mustee and also a possible communication between the diaphragm valve chamber and the pilot burner. Lastly, the Reeve patent shows thermostatic means subject to the heat of a water reservoir for controlling the flow of gas to a main burner together with additional thermostatic means located at the pilot flame for controlling a pressure flow to a diaphragm valve likewise enabled to control the flow of gas to the main burner. None of these earlier patents discloses either a pilot thermostat as a structural unit or thermostatic pilot control of a bleed pipe adapted to have communication with one side of the diaphragm valve chamber.

The operation of an apparatus embodying my invention is as follows:—

It being assumed that a flame exists at the pilot orifices 34 and the water in the storage tank 6 not yet warmed, the inevitable contraction of the tube 24 will force the valve member 26 from its seat thereby affording open communication between the upper side of the diaphragm 15 and the pilot orifice through the pipe 21 past the valve member 26 through the bleed pipe 41 and up into the pilot burner. In consequence the pressure in the main gas pipe 17 will push the diaphragm 15 upwardly to lift the valve member 19 from its seat and allow the gas to flow to the main burner 10 where it becomes ignited by the pilot flame. After the temperature of the water in the storage tank 6 has reached the predetermined desired degree for which the apparatus as a whole is adjusted the expansion of the tube 24 will finally have moved the rod 25 sufficient to close the valve 26 against its seat. Thereupon the gas which continually leaks through the port 20 will accumulate between the diaphragm 15 and the valve member 26 to presently establish therebetween a pressure downwardly upon the diaphragm 15 so as to close the valve member 19 and shut off the flow of gas to the main burner 10. After the diaphragm valve is thus closed, it will stay closed because the area of the valve member 19 against which the pressure in the main gas line 17 is exerted, is less than the area of the diaphragm against the upper side of which the same pressure is being exerted. Subsequently, the operation continually repeats itself the opening movement of the valve member 26 acting to relieve the pressure above the diaphragm and to permit the accumulated gas to flow through the bleed pipe 41 and become burned at the pilot orifices. Now, should the pilot orifices 34 become clogged or should the pilot flame be snuffed out for any reason, it will eventually happen that the main burner is not ignited owing to the adequate temperature of the water in the storage tank 6. After such an occurrence and following the cooling of the water in the tank 6 the diaphragm 15 will be again lifted and the full flow of gas will issue from the main burner, but cannot become ignited. This would obviously entail not only great waste, but the danger of explosion and injury. According to one feature of my invention, after both pilot burner and main burner are out, the pilot tubes will presently sufficiently cool to close not only the needle valve 39 but the diaphragm valve member 19 as well, the last mentioned closing movement occurring by reason of the pressure from the main pipe 17 being carried through the pipe 29, pipe 41 and pipe 21. There is therefore provided not only a pilot burner having an opening adapted to be closed by thermostatic action, but a bleed pipe through which a back pressure may be established whenever such opening in the pilot burner is closed. In order to make possible a re-lighting of the pilot burner the metal surface adjacent to the orifices 34 must be in some manner re-heated. This may be accomplished by merely holding a lighted match there for a few seconds until the expansion of the thermostat tube will be sufficient to at least partially lift the end 39 and so permit some gas to issue from the orifices 34, after which the pilot flame will of course maintain the conical end 39 in its opened position relative to the inlet opening 32. Inasmuch however, as such a re-lighting of the pilot burner would besides necessitating opening the door of the heater, involve some uncertainty in the mind of an owner, especially a lady, I have provided the simple push button valve. As soon as the button 45 is depressed by a finger the pressure above the diaphragm 15 which is closing off the flow of gas to the main burner 10 will be relieved by a harmless escape of gas past the valve 43. In consequence, the gas pressure in the pipe 17 will at least partially lift the diaphragm 15 and gas will flow through the main burner 10 where it may be readily lighted and without danger. The existence of flame from the main burner 10 very promptly heats the pilot thermostat sufficiently to open the inlet 32 so that the pressure of the gas above the diaphragm 15 is thereafter continually reduced by consumption at the pilot burner of the gas which passes above the diaphragm.

My invention is especially advantageous or needful for a storage type of water heater because heretofore the full supply of water in a storage tank could be drawn hot before it would be discovered that the main burner is not supplying heat because of the escape of unignited gas and even though the flue may carry off the gas fumes in sufficient measure to avoid the possibility of explosion, there still would be an enormous waste of gas up the chimney, likely to continue for a period of time of many hours prior to obtaining knowledge of the fact that the pilot is extinguished.

The modification illustrated in Figure III consists merely in connecting the pilot burner with the bleed pipe 41 by means of an elbow 31ª instead of a T connection; and then having the pipe 29 terminate as a nozzle 32ª with its mouth directed toward the expansible element of the pilot thermostat. This form would have the slight disadvantage that if the pilot flame from the nozzle 32ª became extinguished, the small flow of gas which might thereafter issue from the nozzle would be wasted.

Figures IV and V illustrate not only a modified type of storage water heating apparatus, but an arrangement wherein the thermostat which is subjected to the temperature of the water in the tank ordinarily operates independently of the diaphragm valve, instead of alternately building up and relieving pressure against the diaphragm in the same manner that the pilot thermostat does. Figures IV and V also disclose a modified type of pilot thermostat construction. A heating coil 46 has both of its ends in operative communication with a storage tank 47 supported above as a unitary structure. The main gas line 48 is controlled by a valve 49 leading to a pipe 50 which is connected with a tube 51 leading into the mixing chamber of a main burner 52. The opening and closing actions of the valve 49 are accomplished by reciprocal mechanism 53 in articulation with the initiating rod 54 of a thermostat which extends up into the tank 47. Leading from the main gas line 48 at a point ahead of the valve 49 is a supply pipe 55 which leads through a chamber 56 to continue through the pipe 57 with the end of which a pilot burner 58 is connected. This pilot burner is similarly a pilot thermostat incorporating the principles of my preferred form with some changes. It will be seen that it has flame orifices 59 at its upper end and that what may be considered its outlet 60 just ahead of the orifices 59 is adapted to be closed by thermostatic mechanism operating in a different manner. The pilot burner proper 58 is a hollow tube of copper or some other suitable metal having the property of considerable expansion under heat. Guided centrally in the tube 58 is a rod 61 having relatively smaller coefficient of expansion and provided with a tapered upper extremity 62 adapted to fit and close the outlet 60 when the tube 58 is contracted. As the tube 58 expands or lengthens out it carries the rim of the opening 60 away from the tapered extremity of the rod 61 and such relative separation of the parts is maintained whenever the pilot is burning. I have also incorporated in this design of pilot thermostat or thermostatically controlled pilot burner a provision enabling manual control of the outlet valve so as to facilitate a re-lighting of the pilot after it has become cooled. To this end, it will be noticed that the rod 61 extends through a screw threaded closure 63 fitted in the bottom of the pilot burner. There a rod 61 is fashioned as an eye 64 large enough to permit the insertion of a finger so that a downward pull against the action of an interposed spring 65 will carry the end 62 out of the opening 60 thus enabling the gas to flow through the orifices 59 and to be ignited.

That end of the tube 51 which enters the mixing chamber of the burner 52 is clearly shown in Figure V to be formed as a needle valve comprising an opening 66 adapted to be closed by a pointed rod 67 which enters another compartment 68 of the chamber 56 and is there attached to a diaphragm 69 adapted to flex within the compartment 68 against the action of a spring 70 which latter normally holds the diaphragm 69 in the position in which it is shown in Figure V. Should the pilot flame for any reason become extinguished the resultant contraction of the tube 58 will prevent the further flow of gas through the pilot burner and thus tend to dam up the gas pressure in the pipes 55 and 57. The pressure thus accumulated is necessarily exerted against the diaphragm 69 to force it over against the action of the spring 70 and thus close the needle valve 66 and thereby shut off the flow of gas to the main burner 52 from its supply pipe 50.

Figure VI is a diagrammatic view of another modification showing a remote manual control of the main gas line by way of substitution for thermostatic means subject to the temperature of the water in the tank. In other respects the construction coincides with that just described in the two preceeding paragraphs. Therefore, only the changed parts have been supplied with distinct reference characters. Connected with the main gas line 48 is a pipe 71 leading to any convenient location and there supplied with a valve 72 to be manually operated and to control communication between the pipe 71 and another pipe 73 which enters the tube 51 in the same way that the pipe 50 entered it.

Figure VII is another modification of the pilot thermostat. The supply pipe 74 connects with a hollow part 75 provided with an outlet opening 76 where the pilot flame is to be. The part 75 is provided with a series of copper thermostatic elements 77 which support a cap 78 from which a rod 79 depends. The lower end 80 of the rod 79 is adapted to close the outlet 76, but is lifted away from it whenever the heat of the pilot flame expands the supporting elements 77.

Figures VIII, IX and X illustrate the application of the primary principle of my invention to an automatic water heater of the instantaneous type, that is to say, a heater provided with a very large main burner capacity underneath a heating coil of considerable length. Heaters of this type will heat a limited flow of water continuously to a certain temperature when water is drawn. Ordinarily, the main gas valve is automatically opened by the pressure of the water which is effective whenever a faucet is opened. Since, in an instantaneous heater, gas cannot flow to the main burner except when water is being drawn, the discovery that the main burner is not performing its heating function is very soon made, probably within a few minutes. This is a simple deduction from the fact that the flow of water is not being heated. Consequently, the likelihood of gas wastage continuing for long periods of time is small, still, it must be remembered that the amount of unignited gas is at a relatively large rate of flow and therefore the danger from even a brief accumulation of unburned gas in the heater casing is very serious.

Leading to a casing 81 is a water supply pipe 82 which discharges into a valve chamber 83 in which is mounted a piston 84 adapted to be shoved over to allow the water to pass into a pipe 85 whenever a service faucet is opened so as to allow the water pressure to become effective in this way. The pipe 85 is connected with a heating coil 86 provided with an outlet 87 leading to one or more service faucets not shown. Inasmuch as nothing is claimed for such a water valve control of a gas valve, it being very old practice, its description may be brief. As the piston 84 is actuated it carries with it a stem 88 so as to cause the latter to engage the stem 89 of a main gas valve 90 which controls the flow of fuel through a chamber 91. The opening movement of the valve 90 is against the action of a spring 92 which is purposed to again close the valve and return the piston 84 whenever all the service faucets are shut. Entering the gas valve chamber 91 on one side is a main gas line 93, and leaving such chamber on the other side is a pipe connection 94 which communicates with a diaphragm valve chamber 95 divided by a diaphragm 96 which latter is adapted to close the communication between the gas main and the chamber 95 in a manner already explained and as shown in Figure II. Communicating with the chamber 95 on the same side of the diaphragm 96 is a pipe 97 leading to the main burner construction 98. A pilot feed pipe 99 connects the main line 93 both with a bleed pipe 100 leading to the opposite side of the diaphragm 96 and with a pipe 101 which discharges through the inlet opening 102 of a pilot burner. Directing attention to Figure X, it will be observed that the thermostatic pilot burner there shown is further modified by being an inversion of the structural form of pilot thermostat shown in Figure V. The opening 102 is adapted to be closed by a needle valve 103 so as to shut off the flow of fuel to the burner orifices 104 whenever the thermostatic tube 105 through which the orifices 104 are drilled, is permitted to contract. The operation of my thermostatic pilot burner control is the same as was explained in connection with Figures I and II and accordingly need not be repeated.

Figure XI exemplifies the application of my inventions to an emergency fuel valve control shown, described, and claimed in my patent issued December 23, 1919, and numbered 1,325,896; and consists of a broken view of the essential parts as drawn in Figure II of such patent. According to the scheme of that earlier invention of mine a diaphragm was employed to actuate a gas valve to its closed position whenever water pressure should be applied against it by reason of the fusing of a plug which under normal working conditions prevented the water from so doing. For the purpose of simplifying comparison, I have here added one hundred to each of the reference numerals used in such earlier patent to designate the same parts.

A gas valve 118 is adapted to control communication between a gas inlet 106 and a gas outlet 107. The valve 118 is to be actuated by a stem 119 and the latter in turn by a thermostatic prime mover 124 operatively connected therewith by mechanism including the parts 139 and 141. Ordinarily, expansion and contraction reciprocates the rod 124 so as to reciprocate the stem 119 whereby to either open or close the valve 118. Axially aligned with and adapted to engage the stem 119 is an auxiliary stem 151. Such engagement of the stem 151 with the stem 119 will be in a direction to close the valve 118 against the action of a spring 152 and irrespective of the position of the parts 139 and 141. The auxiliary stem 151 is emergency actuated whenever the water, the temperature of which under normal conditions controls the action of the prime moving rod 124, reaches a temperature sufficiently high to melt a plug 145 and flow against the upper side of a diaphragm 150 connected with the upper end of the rod 151. In following such course the water would flow through a spud 144 and through a tube 147 into the diaphragm chamber 148.

It will be seen that I have fitted in the tube 147 a hollow connecting member 200 having communication with a chamber 201 through a common form of check valve 202. A pipe 203 connects the chamber 201 with a part 204 of a thermostatic pilot burner. A pilot burner fuel feed pipe 205 is also connected with the part 204 so that both pipes 203 and 205 communicate through an opening 206 adapted to be closed by a tapered extremity 207 of a needle valve stem 208 carried by a thermostatic composite tubular element 209. When such closing action of the valve 207 occurs the flow of fuel through the pilot burning orifices 210 will be interrupted.

This last modification of my invention includes a double safety control. If the thermostatic mechanism including the prime moving rod 124 and the parts 139 and 141 for any reason fails to operate after the valve 118 has been opened, the temperature of the water in a storage tank, into which the thermostatic tube 121 is intended to project, will reach a degree sufficient to fuse the plug 145 and thus enable the water to press against the diaphragm 150 and close the valve 118. In the meantime the check valve 202 would prevent the water from flowing into the pipe 203. If, on the other hand, the pilot burner became for any reason extinguished and the opening 206 therefore closed the pressure of the gas in the pipe 205 would be conveyed through the pipe 203 and is to be considered sufficient to open the check valve 202 and enable it to be applied against the diaphragm 150 to close the valve 118 in the same manner.

I claim:—

1. An appliance of the character described comprising the combination of a main burner, a gas supply pipe, a diaphragm valve to control the supply of fuel from said gas pipe to said burner, automatically operating means for controlling the pressure on opposite sides of said valve, a pilot burner connected with said pipe, and thermostatically controlled means actuated according to whether there is or is not a flame at the outlet of said pilot burner for automatically controlling the pressure on opposite sides of said diaphragm valve.

2. An appliance of the character described comprising the combination of a main burner, a gas supply pipe, a valve to control the supply of fuel from said gas pipe to said burner, automatically operating means for opening and closing said valve, a pilot burner connected with said pipe, and a thermostatic appliance including a pilot burner valve adapted to close when the flame at said pilot is for any reason extinguished to close a gas conducting pipe.

3. An appliance of the character described comprising the combination of a main burner, a gas supply pipe, a pilot burner, a diaphragm valve having a partial area on its one side exposed to the pressure of the supply gas acting to open it, said valve arranged to control the supply of fuel from said gas pipe to said main burner, a connection between said pilot burner and said supply pipe, a connection between said pilot burner and a larger area on the other side of said diaphragm valve and a thermostatically actuated pilot valve for closing off said pilot burner to build up a gas pressure in said connection, overcome the pressure of the gas in the supply pipe and close said diaphragm valve.

4. An appliance of the character described comprising the combination of a main burner, a gas supply pipe, a valve chamber connecting said burner and pipe, a leaky pressure operated diaphragm valve dividing said chamber to control the flow of fuel from said gas pipe to said burner through one division of said chamber, a pilot burner connected with said pipe and with the other division of said chamber, a pilot burner valve and a thermostat for closing off said pilot burner valve to build up a gas pressure against said diaphragm valve and shut off the flow of gas to both burners.

5. An appliance of the character described comprising the combination of a main burner, a gas supply pipe, a pressure operated valve including a leakage port and adapted to control the supply of fuel from said gas pipe to said burner, a conduit connected with opposite sides of said valve, a pilot burner connected with said conduit and comprising a hollow structure provided with an inlet opening and an outlet opening and provided also with a pair of members having different coefficients of expansion, the arrangement being such that said members assume a relationship when the pilot burner is not ignited which obstructs the passage of fuel therethrough whereby to establish pressure in said conduit sufficient to close said valve.

6. An appliance of the character described, comprising a gas supply pipe, a main burner adapted to communicate therewith, a pilot burner, a flexible diaphragm valve to allow or cut off flow of gas to said main burner, and mechanism adapted to open and close said valve and including a thermostat operating in response to changes in temperature at said pilot burner whereby said valve is closed when the pilot burner is cold and opened when the pilot burner is hot.

7. An appliance of the character described comprising the combination of a valve chamber, a main burner and a gas supply pipe adapted to communicate through said chamber, a pressure operated diaphragm valve in said chamber to control communication from said gas pipe to said burner past one side of said diaphragm valve, a pilot burner connected with said pipe, a connection between said pilot burner and said chamber on the other side of said diaphragm valve, a valve in said connection, means for opening and closing said valve, and a thermostatic device at said pilot adapted to control the escape of fuel therefrom, depending upon whether the pilot is or is not ignited whereby to control the position of said diaphragm valve.

8. An appliance of the character described comprising the combination of a main burner, a gas supply pipe, a valve to control the supply of fuel from said gas pipe to said burner, a pilot burner connected with said pipe, agencies for moving said valve including a part exposed on its opposite sides to the pressure of gas, a second valve at said pilot burner and a thermostat for closing off said second pilot valve to built up a gas pressure against said part and close said first mentioned valve.

9. In a water heating apparatus, a storage tank, a heating conduit in connection therewith, a main gas burner for heating said conduit, a pilot burner, a gas pressure operated diaphragm valve for controlling the flow of gas past said valve and to said main burner, thermostatic means subjected to the heat of the circulating water for controlling the pressure exerted against said valve, and thermostatic means subjected to the heat of the pilot for likewise controlling the pressure exerted against said valve.

10. An appliance of the character described comprising the combination of a main burner, a gas supply pipe, a leaky diaphragm valve to control the communcation between said pipe and burner past one side of such valve which is subject to the pressure of the gas supply, a conduit communicating with both sides of said valve, a valve in said conduit, a thermostat for operating said last mentioned valve to control the pressure of accumulated gas on the opposite side of said diaphragm valve, a pilot burner, a connection between said pilot burner and said thermostatically operated valve, a pilot valve between said pilot burner and connection and another thermostat for operating said pilot valve.

11. A water heating apparatus comprising the combination of a heating conduit, a main burner therebelow, a gas supply passage, a diaphragm valve to control the communication between said passage and burner and provided with a leakage port, a pipe communicating with said leakage port and connected with said supply passage, a valve in said pipe, a thermostat subjected to the heat of the water in said conduit for operating said thermostatically operated valve, a pilot burner connected with said pipe, a third valve controlling said connection and another thermostat subjected to the heat from said pilot burner for operating said last mentioned valve; the arrangement being such that either the closing of one of said thermostatically operated valves may determine the position of said diaphragm valve or the opening of one thermostatically operated valve and the closing of the other thermostatically operated valve may determine the position of said diaphragm valve.

12. A water heating apparatus comprising the combination of a storage tank, a heating coil, a main burner therebelow, a gas supply pipe, a diaphragm valve to control the communication between said pipe and burner past one side of such valve which is subject to the pressure of the gas supply, said diaphragm valve being adapted to permit a leakage, a conduit communicating through both sides of said leakage port, a second valve in said conduit, a thermostat subjected to the heat of the water in said tank for operating said second valve to control the pressure of accumulated gas therein, a pilot burner communicating with said supply pipe, a connection between said pilot burner and said second valve, a third valve controlling escape of gas through said pilot burner and another thermostat subjected to the heat from said pilot burner for operating said last mentioned valve; whereby the closing of said second valve shuts off the flow of gas to said main burner, and the closing of said third valve does likewise if the second valve is open.

13. An appliance of the character described comprising a gas pressure main, an endless fuel conduit connected with said main so as to enable the flow of fluid therethrough in both directions from said main, a valve adapted to close said conduit, a main gas burner adapted to receive fuel from said conduit on one side of said valve, a pilot burner adapted to receive fuel from said conduit on both sides of said valve, means for operating said valve, pressure operated means for controlling the flow of fuel to said main burner, a valve for controlling the flow of fuel to said pilot burner, and thermostatic means for operating said last mentioned valve, whereby, when said first mentioned conduit valve is open and said pilot valve is closed the gas pressure will actuate said pressure operated means to shut off the fuel to the main burner.

14. An appliance of the character described comprising a main gas line, an endless fuel conduit connected with said gas line so as to enable the flow of fluid therethrough in both directions from said gas line, a valve adapted to close said conduit, a main gas burner connected with said conduit on one side of said valve, a pilot burner connected with said conduit on both sides of said valve, thermostatic means for operating said valve, a perforated diaphragm valve for controlling the flow of fuel to said main burner, a valve for controlling the flow of fuel to said pilot burner, and thermostatic means for operating said last mentioned valve, whereby, when said first mentioned conduit valve is open and said pilot valve is closed the gas will accumulate a pressure on the other side sufficient to close communication between said gas line and main burner.

15. An appliance of the character described comprising the combination of a chamber, a main gas burner, a gas supply pipe adapted to conduct fuel thereto through said chamber, a leaky pressure operated valve adapted to close communication between said pipe and burner, a bleed pipe communicating with the side of said valve to which the gas from the supply pipe can leak, a pilot burner connected with said bleed pipe, and thermostatic means subjected to the heat at the pilot for controlling the outlet of said bleed pipe and in consequence the pressure of the accumulated gas therein.

16. An appliance of the character described comprising the combination of a chamber, a main gas burner, a gas supply pipe adapted to conduct fuel thereto through said chamber, a diaphragm valve in said chamber and adapted on one side to close communication between said pipe and burner, a bleed pipe communicating with said chamber on the other side of said diaphragm, a pilot burner connected with said bleed pipe, a valve to control said connection, and thermostatic means subjected to the heat at the pilot for controlling the position of said valve and in consequence the gas pressure on such other side of the diaphragm.

17. An appliance of the character described comprising a gas pressure main, an endless fuel conduit connected with said main so as to enable the flow of gas therethrough in both directions from said main, a main gas burner adapted to receive fuel from said conduit, a pressure-operated valve in said conduit to control the flow of gas to said main burner, a pilot burner connected with said conduit so as to receive fuel from both sides of said pressure-operated valve, a pilot valve for controlling the flow of fuel from either side of said pressure-operated valve to said pilot burner, and thermostatic means for operating said pilot valve, whereby, when its valve is closed the gas pressure will actuate said pressure-operated valve to shut off the fuel to the main burner.

18. An appliance of the character described comprising a main gas line, a fuel conduit connected with said gas line, a valve adapted to close said conduit, a main gas burner connected with said conduit between its point of connection with said gas line and one side of the said valve, a pilot burner connected with said conduit between its point of connection with said gas line and the other side of said valve, thermostatic means for operating said valve, a leaky diaphragm valve for controlling the flow of fuel to said main burner, said diaphragm valve being opened by the main line pressure against its one side and closed by the pressure of accumulated leakage of gas to its other side, a valve for controlling the flow of fuel to said pilot burner, and thermostatic means for operating said last mentioned pilot valve, whereby, when said pilot valve is closed the gas leaking past said diaphragm will accumulate a pressure on the other side of said diaphragm sufficient to close communication between said gas line and main burner.

19. An appliance of the character described comprising the combination of a chamber, a diaphragm dividing said chamber and including a leakage port from one division to the other, a main burner communicating with one division of said chamber, a pilot burner, a gas supply pipe connected with the same division of said chamber as that with which the main burner is connected, said pipe being also connected with said pilot burner, a conduit adapted to connect the other division of said chamber with said pilot burner, means for controlling the communication through said last mentioned connection, said chamber dividing means being shiftable in response to gas pressure actuation to make or break communication between said gas supply pipe and main burner, and a thermostatically operated valve carried by said pilot burner for controlling the flow of gas therethrough.

20. An appliance of the character described comprising the combination of a chamber, a diaphragm dividing said chamber and including a leakage port from one division to the other, a main burner communicating with one division of said chamber, a pilot burner, a thermostatically controlled valve adapted to cut off flow of fuel to said pilot burner, a gas supply pipe connected with the same division of said chamber as that with which the main burner is connected, said pipe being also connected with one side of said pilot burner valve, a conduit adapted to connect the other division of said chamber with the same side of said pilot burner valve, automatically operating means for controlling the communication through said conduit, said chamber dividing means being shiftable in response to gas pressure accumulation when said pilot valve is closed whereby to make or break communication between said gas supply pipe and main burner.

21. The combination of a gas supply pipe, an endless gas conduit, a burner adapted to receive fuel from said conduit, a leaky valve to control passage of fuel to said burner, and two thermostatically controlled auxiliary valves in said conduit one adapted to cut off flow of gas around said conduit and the other adapted to cut off the escape of any gas from said conduit.

22. The combination of a water circulating system including a heating coil, a gas supply pipe, an endless gas conduit, a pilot burner connected with said conduit, a main burner below said coil and connected with said conduit, a normally closed leaky valve in said conduit adapted when open to admit and when closed to entirely cut off fuel to said main burner connection and to be opened by pressure of the gas supply against one side and to be closed by pressure on its opposite side, two auxiliary valves in said conduit, a thermostatic device actuated in response to changes of temperature of the water in said system for controlling one of said auxiliary valves, and another thermostatic device actuated in response to the existence or absence of a flame at said pilot burner for controlling the other of said auxiliary valves.

23. An appliance of the character described comprising in combination a main burner, a diaphragm valve for said main burner, said valve fashioned with a relatively small leakage port and adapted to be opened by the gas supply pressure against one side to admit gas to said main burner, a connection between opposite sides of said valve, a pilot burner adapted to communicate with said connection, auxiliary valves in said connection and each adapted when closed to cause the closing of said diaphragm valve, and automatically operating agencies for actuating said auxiliary valves respectively, one of said auxiliary valves being moreover adapted to close the communication of said pilot burner with said connection.

24. An appliance of the character described comprising in combination a gas supply pipe, a main burner, a diaphragm valve for said main burner, said valve fashioned with a relatively small leakage port and adapted to be opened by the gas supply pressure against one side to admit gas to said main burner, a connection between the other side of said valve and said supply pipe, a pilot burner adapted to communicate with said connection, a thermostatically actuated valve for closing said communication, an auxiliary valve in said connection, and automatically operating means for actuating said auxiliary valve.

25. An appliance of the character described comprising in combination a gas supply pipe, a main burner, a diaphragm valve for said main burner, said valve fashioned with a relatively small leakage port and adapted to be opened by the gas supply pressure against one side to admit gas to said main burner, a connection between the other side of said valve and said supply pipe, a pilot burner adapted to communicate with said connection, a thermostatically actuated valve for closing said communication, an auxiliary valve located in said connection at a point between said diaphragm valve and pilot burner, and a thermostatic device for actuating said valve to its closing position whereby to establish a gas pressure against the other side of said diaphragm valve adapted to shut off the gas to said main burner.

26. An appliance of the character described comprising the combination of a main burner, a gas supply pipe, a valve chamber connecting said burner and pipe, a leaky pressure operated diaphragm valve dividing said chamber to control the flow of fuel from said gas pipe to said burner through one division of said chamber, and a manually operable valve to permit when open the direct escape of gas to the atmosphere from the other division of said chamber whereby to release the closing pressure against said diaphragm valve and cause it to be opened and gas to flow to said main burner.

27. An appliance of the character described comprising the combination of a main burner, a gas supply pipe, a valve chamber connecting said burner and pipe, a leaky pressure operated diaphragm valve dividing said chamber to control the flow of fuel from said gas pipe to said burner through one division of said chamber, said valve having a partial area on its one side exposed to the pressure of the gas supply acting to open it, a pilot burner connected with the other division of said chamber, a valve for controlling communication through said connection, a push button valve to permit when open the escape of gas from the last mentioned division of said chamber whereby to release the closing pressure against said diaphragm valve and cause it to be opened and gas to flow to said main burner preparatory to convenient relighting of it and necessarily of the pilot.

28. An appliance of the character described comprising the combination of a main burner, a gas supply pipe, a valve chamber connecting said burner and pipe, a leaky pressure operated diaphragm valve dividing said chamber to control the flow of fuel from said gas pipe to said burner through one division of said chamber, a pilot burner connected with the other division of said chamber, a pilot burner valve for controlling communication through said connection, a pilot burner thermostat for opening and closing said pilot burner valve and a manually operable valve to permit when open the escape of gas from the last mentioned division of said chamber whereby to release the closing pressure against said diaphragm valve and cause it to be opened and gas to flow to said main burner preparatory to convenient relighting of it and presently reheating of the pilot thermostat.

29. In a water heater, a reservoir, a gas supply pipe, a main burner, a main gas valve for controlling the flow to said burner, a gas pressure operated device opening said valve in response to pressure in the supply pipe against its one side, a pilot burner, two independent valves for modifying the gas pressure against the other side of said device, and two thermostatic devices for operating said two valves respectively, one responding to the temperature of the water in said reservoir and the other responding to the heat of the pilot burner, the arrangement being such that when either of last mentioned two valves is closed said device closes the main gas valve in response to pressure against its other side.

30. In a water heater, a gas supply pipe, a main burner, a leaky main gas valve for controlling the flow to said burner, a gas pressure operated diaphragm having a partial area on its one side exposed to the pressure in the supply pipe and adapted in response thereto to open said valve, said diaphragm having a relatively larger exposed area on its other side, a pilot burner, a connection located between said pilot burner and the larger exposed side of said diaphragm to which connection gas leaks, two independent valves in said connection for equalizing the gas pressure on opposite sides of said device, means for operating one of said last mentioned valves, and a thermostatic device for operating the other of said two valves and responding to the heat of the pilot burner.

31. In combination, a main burner, a pilot burner, a main gas valve opening under the pressure of gas from a supply main on one side and closing by a built-up pressure of gas at its other side, a conduit leading to said other side of the main valve and independent of said valve, a supplemental valve which controls the said conduit and the building up of the closing gas pressure on said other side of the main valve, a thermostat which controls the supplemental valve to admit or cut off a gas supply to said other side of the main valve, a supply connection for the pilot burner, said connection communicating with said conduit, and a pilot burner valve also adapted to control the building up of the closing gas pressure in said conduit.

32. In combination, a main burner, a main gas valve opening under the pressure of gas from a supply main on one side and closing by a built-up pressure of gas at its other side, a conduit leading to both sides of the main valve so as to be applied with gas irrespective of the position of said valve, said conduit being provided with a bleed orifice, a supplemental valve which controls flow through said conduit and the building up of the closing gas pressure on said other side of the main valve, and emergency means operating automatically to close said bleed orifice when no gas is ignited, thereby preventing the escape of any gas.

33. A water heater comprising the combination of a water container, a main burner, a pilot burner, a main gas valve opening under the pressure of gas from a supply main on one side and closing by a built-up pressure of gas at its other side, a conduit leading to said other side of the main valve and independent of said valve, a supplemental valve which controls the said conduit and the building up of the closing gas pressure on said other side of the main valve, a thermostat responsive to the water temperature to control the supplemental valve and admit or cut off a gas supply to said other side of the main valve, a supply connection for the pilot burner, said connection communicating with said conduit, a pilot burner valve also adapted to control the building up of the closing gas pressure in said conduit, and a pilot burner thermostat for operating said pilot burner valve.

34. An appliance of the character described comprising the combination of a gas supply pipe, a pilot burner connected therewith, a pilot burner valve controlling said connection, a thermostat opening said valve when heated, another burner connected with said supply pipe and adapted when ignited to heat said pilot thermostat, and a push button valve to permit when open the flow of gas to said last mentioned burner preparatory to convenient lighting of it, heating of said thermostat and ignition of the pilot burner.

35. In combination, a main burner, a pilot burner, a main gas valve opening under the pressure of gas from a supply main on one side and closing by a built-up pressure of gas at its other side, a conduit leading to said other side of the main valve and independent of said valve, a supplemental valve which controls the said conduit and the building up of the closing gas pressure on said other side of the main valve, a supply connection for the pilot burner, said connection communicating with said conduit, and a pilot burner thermostat for operating said supplemental valve.

36. The combination of a looped conduit in connection with a gas supply pipe, a main burner connected with said conduit, a diaphragm valve for controlling the connection of said main burner with said conduit, said diaphragm valve being adapted to be opened and closed by gas pressure, a pilot burner connected with said conduit, a valve arranged to control the escape of gas from said pilot burner without disturbing the communication along said conduit, and automatically operating means for actuating said pilot burner valve.

37. The combination of an endless conduit adapted for connection with a gas supply main, a burner connected with said conduit, and emergency means operating automatically when no gas is ignited at said burner to prevent the flow of gas from said conduit to said burner.

38. The combination of a gas supply pipe, a looped conduit having both ends connected therewith, a burner connected with said conduit, a valve controlling the burner connection, and thermostatic means for operating said valve.

39. In combination, a main burner, a gas valve operable in response to gas pressure to admit or cut off flow of gas to said burner, a conduit connected with opposite sides of said valve, a pilot burner connected with said conduit, and automatically operating means including a valve adapted to close the connection of said pilot burner whenever it is not ignited.

40. In combination, a chamber, a diaphragm dividing said chamber, a main burner connected with one division of said chamber, a pilot burner connected with both divisions of said chamber, a main gas valve operable in response to gas pressure to admit or cut off flow of gas to said main burner, and automatically operating means for closing the connection of said pilot burner with both divisions of said chamber.

41. In combination, a chamber, a pressure operated device dividing said chamber, a main burner connected with one division of said chamber, a pilot burner connected with both divisions of said chamber, a main gas valve adapted to be opened by the pressure of gas in a supply pipe to allow flow of gas to said burner and to be closed by an excess of pressure in opposition to the pressure in said supply pipe to prevent flow of gas to said burner, and thermostatic mechanism operating automatically to simultaneously close connection of said pilot burner with both divisions of said chamber to build up said excess or closing pressure and prevent the escape of any gas.

42. In combination, a main burner, a main gas valve opening under the pressure of gas from a supply main on one side and closing by a built-up pressure of gas at its other side, a conduit leading to said other side of the main valve and independent of said valve, a pilot burner connected with said conduit, a supplemental valve controlling said pilot burner connection, and a pilot burner thermostat emergency means for controlling said valve.

43. The combination of an endless conduit adapted for connection with a gas supply pipe, a main burner and a pilot burner both connected with said conduit, a normally open pressure operated valve for said main burner and a thermostatically operated valve adapted to close when no gas is ignited at said pilot burner to prevent the escape of gas through said pilot burner thereby automatically closing the main burner valve.

Signed by me, this 3rd day of November, 1919.

HERBERT J. LONG.